Nov. 8, 1955 P. BLUM ET AL 2,722,701
WINDOW WASHER AND WIPER
Filed Feb. 18, 1952 2 Sheets-Sheet 2
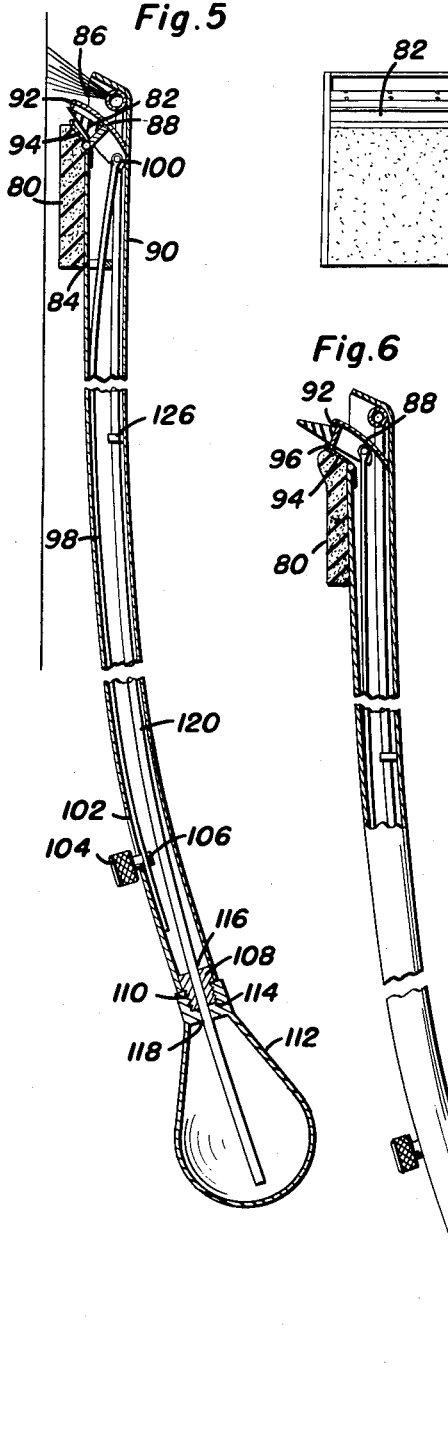
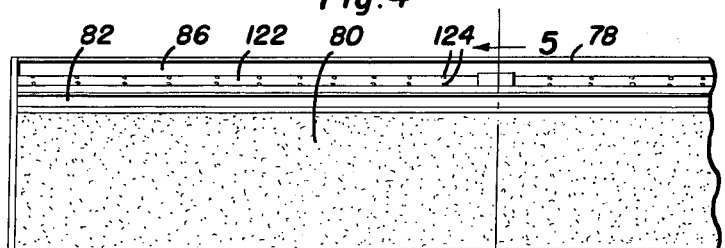
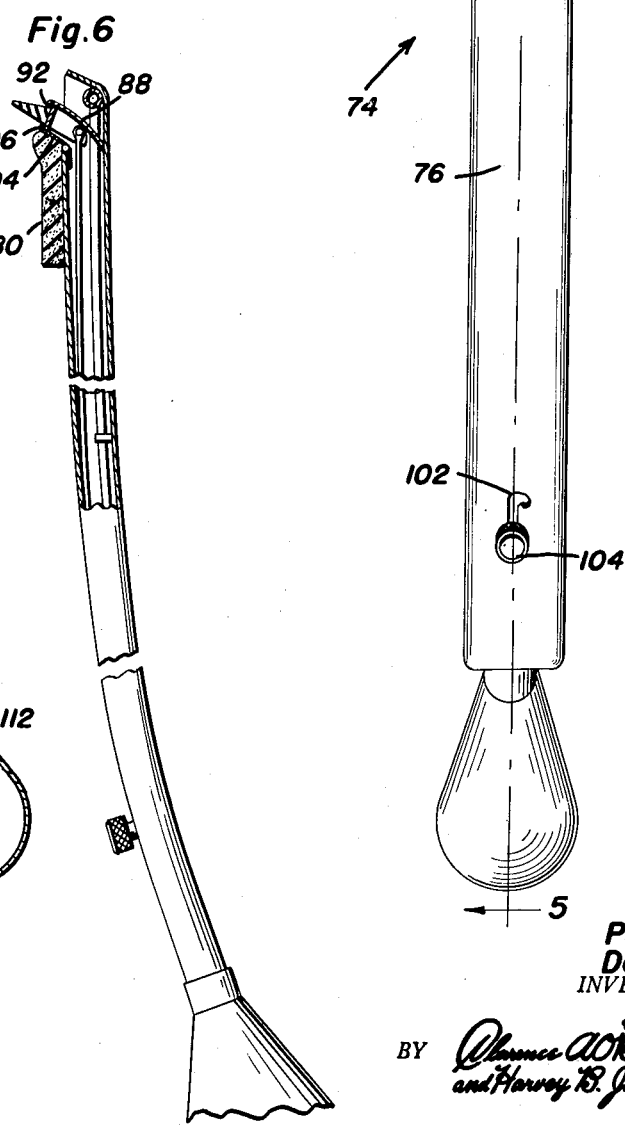
Paul Blum
Dora Blum
INVENTORS.

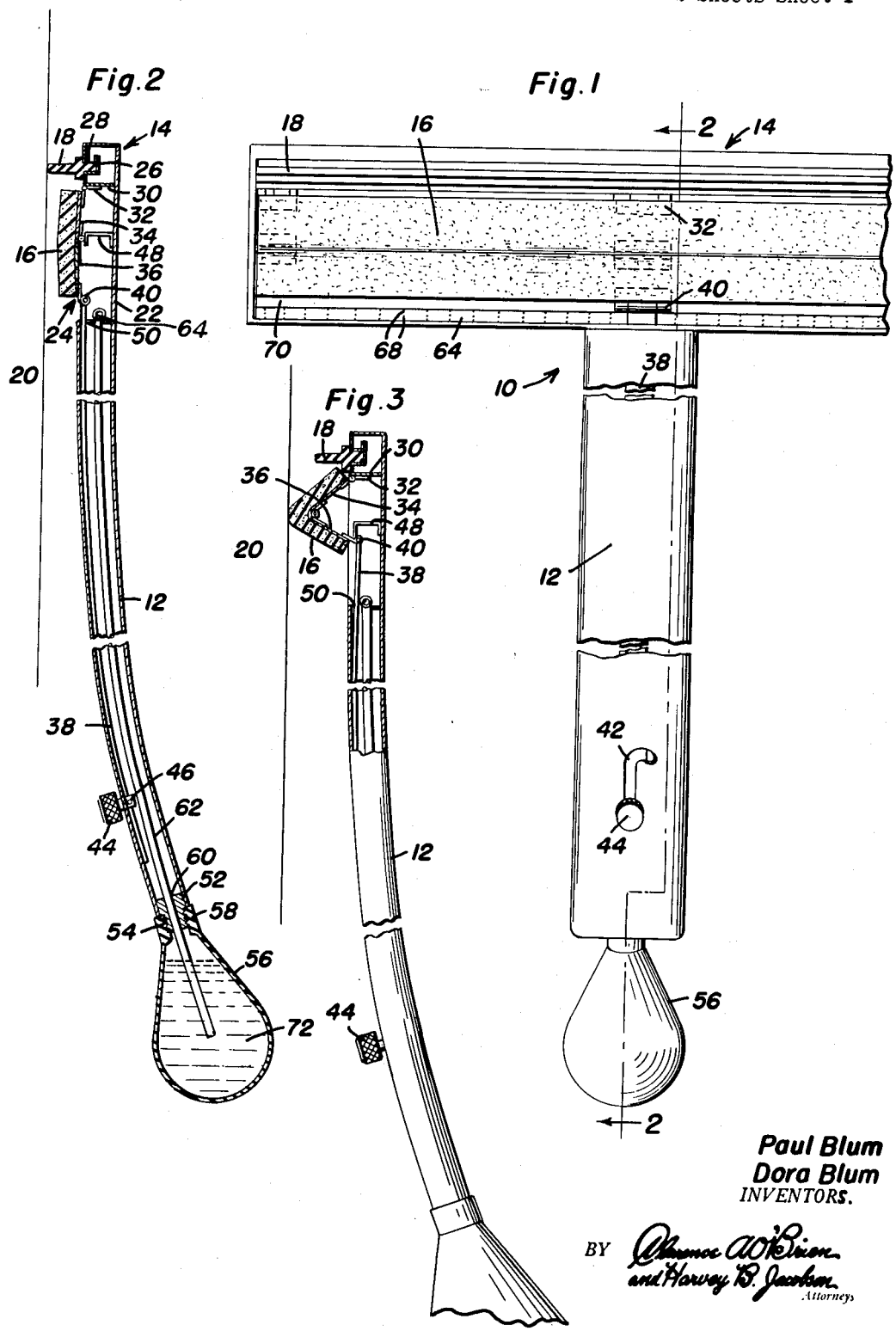

United States Patent Office 2,722,701
Patented Nov. 8, 1955

2,722,701

WINDOW WASHER AND WIPER

Paul Blum and Dora Blum, New York, N. Y.

Application February 18, 1952, Serial No. 272,032

6 Claims. (Cl. 15—126)

The present invention relates to window washers and more particularly relates to a combination window washer and wiper that is an improvement on application Serial #198,307, filed November 30, 1950, now Patent No. 2,672,638.

It is a primary object of the invention to provide a combination window washer and wiper device having a washing and a wiping element thereon and means operable from the handle of the device for projecting one of the elements beyond the other.

Another important object of the invention is to provide a combination window washer and wiping device which contains its own liquid supply means wherein the liquid supply reservoir serves as a means to force the liquid through spray nozzles in the head of the device.

A still further object of the present invention is to provide a combination window washing and wiping device that is light, sturdy of construction and extremely versatile of application.

Yet another object of the present invention is to provide a combination window washing device with a narrow profile whereby it may be inserted in small spaces such as those occurring between upper and lower window panes.

These, together with various and ancillary features and objects of the invention which will later become apparent as the following description proceeds, are attained by this device, a preferred embodiment of which has been illustrated by way of example only in the accompanying drawings:

Figure 1 is a front view of the combination window washing and wiping device of the present invention;

Figure 2 is a cross sectional view of the device of Figure 1 taken substantially along section line 2—2 of Figure 1;

Figure 3 is a side view, partly in section, of the device of the present invention showing the washing element projected beyond the wiping element;

Figure 4 is a front view of a modification of the combination window washing device of the present invention;

Figure 5 is a cross sectional view of the modification of Figure 4 taken substantially along section line 5—5 of Figure 4; and Figure 6 is a side view of the modification of Figure 4, partly in section, showing the wiping element projected beyond the washing element.

Like reference characters are used to designate similar parts throughout the specification and the various views of the accompanying drawings.

Referring now to Figures 1-3 of the accompanying drawings, the combination window washing and wiping device of the present invention is designated in its entirety by the numeral 10. The device 10 comprises a tubular handle 12 to the upper end of which is secured a transversely extending head 14. Secured to the front wall or face of the head 14 are a washing element 16 and a wiping element 18, the washing element 16 is in the form of a soft, absorbent pad which may be of sponge rubber, natural sponge or any of the numerous synthetic spongey materials on the market while the wiping element or squeegee 18 is shown as being of hard rubber and of cruciform cross section.

The head 14 is in the form of a hollow rectangular block that is rigidly secured to the upper end of the handle 12.

In Figure 2 of the drawings, the device 10 is shown with the wiping element or squeegee 18 in engagement with a window pane 20. The rear wall 22 of the head 14 is shown as being a solid panel while the front wall 24 of the head is specially constructed to carry the washing and wiping elements 16 and 18 respectively. An upper recess 26 is formed in the front wall 24 throughout its length by the inturned flange portion 28 and the channel member 30 spaced below the inturned flange 28. It will be noted that the end of one leg of the channel 30 is secured to the rear wall 22 of the head 14 while the other leg of the channel is bent to an L-shape and secured to the end of inturned flange 28. The squeegee 18 is seated and secured permanently in the recess 26. Secured to the lower leg of the channel 30 adjacent the web thereof are a plurality of spaced hinges 32 to which are secured the vertically depending plate 34. Pivotally secured to the lower depending edge of plate 34 is plate 36. Extending from the lower end and through the handle 12 is a substantially rigid rod 38 which projects into the head 14 adjacent the front wall 24 thereof. Pivotally secured to the upper end of the rod 38 is a plate 40, which plate is in turn rigidly secured to the lower edge of the front wall plate 36. The washing element 16 is secured to the front faces of plates 34 and 36.

Adjacent the lower end of the front face of the tubular handle 12 is an inverted J-shaped slot 42 through which extends a knob or button 44 which is rigidly secured by the lug or pin 46 to the rod 38. By vertically reciprocating the button 44 in the slot 42, the rod 38 is likewise vertically reciprocated within the handle 12 whereby the plates 34 and 36 are collapsed toward one another, thus projecting the washing elements 16 beyond the squeegee 18 as is clearly apparent from an examination of Figure 3.

An inverted U-shaped bracket 48 is mounted adjacent the hinged or pivotal connection of plates 34 and 36 to prevent inward collapsing of these plates into the interior of the head 14. Thus, the plates 34 and 36 are permitted to collapse in an outward direction to assure projection of the washing element 16 beyond the squeegee 18. Obviously, the upper end of the inverted J-shaped slot 42 will lock the knob or button 44 into place thus retaining the washing element 16 in its projected position. It is to be noted that the rod 38 is in the form of a flat strip that is capable of limited sidewise flexure, which flexure is encountered when locking the rod in its upper or lowered position by means of the button 44 in the inverted J-shaped slot 42. It is to be noted however, that the upper end of the rod 38 is maintained against sidewise flexure away from the wall of the handle 12 as it is substantially maintained against such movement by its passage through the slot 50 formed in the base of the head 14.

The lower end of the handle 12 is closed by means of plug 52. The exposed end of the plug 52 is externally threaded as at 54 and a collapsible and expansible bulb 56 is correspondingly internally threaded as at 58 whereby the bulb 56 is removably secured to the plug 52. An axial bore 60 extends through the plug 52 and a tubular member 62 extends through the bore 60 and terminates within the interior of the bulb 56. The tubular element 62 extends within the handle 12 and terminates at its upper end in the crosshead 64, which crosshead extends throughout the length of the head 14 and is provided with a plurality of liquid spray nozzles 68. It will be noted that the crosshead 64 and the spray nozzles 68 are at all times in communication with the exterior of the front face of the head through the opening 70 extending throughout the length of the front face 24 of the head.

Thus, the bulb 56 forms a liquid reservoir with the lower end of the tubular element 62 extending into the liquid 72 in the reservoir. By expanding and collapsing the bulb 56, the liquid 72 is forced through the tubular elements 62 into the crosshead 64 and thence through the spray nozzles 68 onto the surface 20 to be washed. Consequently, it can be seen that the combination washing and wiping device of the present invention is a self-contained unit which needs no external source of liquid supply. Accordingly, it is believed obvious that the device could be used to great advantage by motorists, garage attendants etc.

With reference particularly to Figures 2 and 3, it can be seen that the handle 12 is curved away from the head 14 at its lower end. Thus, the operator of the device may maintain a comfortable grip on the handle while washing windows from almost any angle without the danger of scraping his knuckles or the necessity of changing his grip to avoid such danger.

Referring now to Figures 4–6 of the accompanying drawings, a modification of the combination window washer and wiper of the present invention is indicated in its entirety by the numeral 74. The combination device 74 comprises a handle 76 having a head 78 rigidly secured to the upper end thereof. Secured to the front of the head 78 are washing element 80 and wiping element 82 which extend substantially horizontally across the front face 84 of the head 78. The upper portion of the front face 84 of the head 78 is open as at 86 throughout its length for purposes which will later become apparent. An arcuate shaped plate 88 extends through out the length of the front face or wall 84 of the head 78 and is secured at its inner end to the inner surface of the rear wall 90 of the head. It will be noted, particularly with reference to Figures 5 and 6, that this plate 88 defines the lower limits of the opening 86 in the upper end of the head 78. The free edge of the plate 88 terminates in a lip 92, the purpose of which will also later become apparent. Spaced below the wiping element 82 and secured to the front face or wall 84 of the head 78 is the washing element 80. The upper end of the front wall 84 terminates below the upper edge of the washing element 80 and an arcuate shaped plate 94 is pivotally secured to the upper end of the wall 84 and is further secured to the rear face of the washing element 80. The free end of the plate 94 terminates in a lip 96 which extends toward but is spaced from the lip 92 of the plate 88. Received between plates 94 and 88 is the wiping element or squeegee 82; thus, the plates 88 and 94 serve as a guide passage for the squeegee 82.

A rod 98 is pivotally secured at 100 to the inner edge of the squeegee 82. The rod 98 extends through the tubular handle 76 and terminates near the lower end of the handle. The lower front face of the handle 76 is provided with an inverted J-shaped slot 102 through which extends a knob or button 104 which is rigidly secured to the lower end of the rod 98 as at 106. Thus, the rod 98, which is in the form of a flat elongated strip, may be vertically reciprocated within the handle 76 by a vertical reciprocation of the button 104 in the inverted J-shaped slot 102.

Upon vertical movement of the rod 98, the wiping element or squeegee 82 is projected through the guide passage formed by plates 88 and 94 to a position beyond the washing element 80 and is prevented from further movement by the inturned lip portions 92 and 96 of plates 88 and 94 respectively. In this connection, it will be noted that plate 94 is constantly urged against the lower face of the wedge-shaped wiping element 82 by the yielding pressure exerted on this member by the washing element 80. Therefore, when the squeegee 82 is projected beyond the front face of the head 78 it is held in a rigid position both by the action of the inturned lip portions 92 and 96 and by the seating of the knob 104 in the arcuate end portion of the J-shaped slot 102. It is to be noted, however, that the plate 94 could be spring biased rather than by the washing element as shown in the preferred embodiment as shown in the drawings.

Secured to and closing the lower end of the handle 76 is a plug 108 which has an externally threaded exposed lower end 110. A bulb 112 is internally threaded as at 114 at its upper end and is, accordingly, threadedly secured to the plug 108. An axially extending bore 116 extends through plug 108 and communicates with a bore 118 in the bulb 112. A tubular element 120 extends through the communicating bores 116 and 118 and terminates at its lower end within the bulb 112. The upper end of the tubular element 120 terminates in a tubular crosshead 122 which is in communication with the opening 86 at the top of the head 78.

The bulb 112 is of the expansible and collapsible type and forms a liquid reservoir into which the end of tubular element 120 extends. By collapsing and expanding the bulb 112 liquid is forced through tubular element 120 into crosshead 122 and thence through spray nozzles 124 in the crosshead 122 onto the surface to be sprayed. Bracket clamp 126 secures the tubular element 120 to the wall of the handle 76 to retain the same against lateral movement within the handle.

From the foregoing description, the construction and operation of the invention will be readily apparent and further explanation is believed to be unnecessary. However, since numerous modifications and changes will readily occur to those skilled in this art after a consideration of the foregoing specification and accompanying drawings, it is not desired to limit the invention to the exact construction shown and described. Accordingly, all suitable modifications and equivalents may be resorted to falling within the scope of the appended claims.

Having described the invention, what is claimed as new is:

1. A window washer comprising a tubular handle, a head rigidly secured to the upper end of said handle, said head having a substantially flat front wall, washing and wiping elements secured to said head in vertically spaced relation to one another and extending horizontally across said front wall, said front wall having an opening extending horizontally thereacross in spaced relation to said elements, a liquid spray means disposed in said window washer, said spray means extending through said handle and having outlet nozzles in communication with said head front wall opening, a liquid supply reservoir connected to the lower end of said handle, a portion of said liquid spray means terminating in said reservoir, and projecting means on said handle for projecting one of said elements forwardly of the other, said projecting means including a rod extending through said handle and into said head, one end of said rod being pivotally secured to one of said elements, the other end of said rod terminating adjacent the lower end of said handle, a lug connected to said other end of said rod and extending through a longitudinal slot in said handle for vertically reciprocating said rod, and locking means on said handle for securing said rod in selected vertical positions.

2. A window washer comprising a tubular handle, a head rigidly secured to the upper end of said handle, said head having a substantially flat front wall, washing and wiping elements secured to said head in vertically spaced relation to one another and extending horizontally across said front wall, said front wall having an opening extending horizontally thereacross in spaced relation to said elements, projecting means on the lower end of said handle for projecting one of said elements forwardly of the other, said projecting means including a rod extending through said handle and into said head, one end of said rod being pivotally secured to one of said elements, the other end of said rod terminating adjacent the lower end of said handle, a lug connected to said other end of said rod and extending through a longitudinal slot in said handle for vertically reciprocating said rod, and locking means on said handle for securing said rod in selected vertical positions.

3. A window washer comprising a tubular handle, a head rigidly secured to the upper end of said handle, said head having a substantially flat front wall, washing and wiping elements secured to said head in vertically spaced relation to one another and extending horizontally across said front wall, said front wall having an opening extending horizontally thereacross in spaced relation to said elements, projecting means on the lower end of said handle for projecting one of said elements forwardly of the other, said projecting means including a rod extending through said handle and into said head, one end of said rod being pivotally secured to one of said elements, the other end of said rod terminating adjacent the lower end of said handle, a lug connected to said other end of said rod and extending through said handle for vertically reciprocating said rod, and locking means on said handle for securing said rod in selected vertical positions including said handle having an inverted J-shaped slot therein adjacent said other end through which said lug extends.

4. A window washer comprising a tubular handle, a head rigidly secured to the upper end of said handle, said head having a substantially flat front wall, washing and wiping elements secured to said head in vertically spaced relation to one another and extending horizontally across said front wall, said front wall having an opening extending horizontally thereacross in spaced relation to said elements, projecting means on the lower end of said handle for projecting one of said elements forwardly of the other, a portion of said front wall carrying said washing element comprising a hinged plate comprising a pair of horizontally extending strips hingedly connected to one another, said plate being pivotally secured to said head at its upper edge, said projecting means including a rod extending through said handle and having an end terminating in said head, the lower edge of said plate being pivotally secured to the end of said rod terminating in said head, the other end of said rod terminating adjacent the lower end of said handle, a lug connected to said other end of said rod and extending through a longitudinal slot in said handle for vertically reciprocating said rod to collapse said hinged plate and project said washing element forwardly of said wiping element.

5. A window washer comprising a tubular handle, a head rigidly secured to the upper end of said handle, said head having a substantially flat front wall and a spaced back wall, washing and wiping elements secured to said head in vertically spaced relation to one another and extending horizontally across said front wall, said front wall having an opening extending horizontally thereacross in spaced relation to said elements, projecting means on the lower end of said handle for projecting one of said elements forwardly of the other, said wiping element being disposed above said washing element and being normally retracted in said head through said opening, the edge of said front wall adjacent said opening being hinged and extending forwardly of said front wall, a plate secured to said back wall and extending into said opening in spaced relation to said hinged edge of said front wall to form a guide passage for said wiping element, said projecting means including a rod extending through said handle and having an end pivotally connected to said wiping element, and means on said handle for vertically reciprocating said rod to project said wiping element through the guide passage to a position forwardly of said front wall.

6. A window washer comprising a hollow handle, a head rigidly secured to the upper end of said handle, washing and wiping elements secured to said head in vertically spaced relation to one another, projecting means on said handle for projecting one of said elements forwardly of the other, said projecting means including a rod extending reciprocably through said handle and into said head, one end of said rod being pivotally secured to one of said elements and extending and retracting the same upon reciprocation of said rod, and means connected to the other end of said rod adjacent the lower end of said handle for reciprocating said rod.

References Cited in the file of this patent

UNITED STATES PATENTS

| 138,528 | Reed et al. | May 6, 1873 |
| 371,515 | Nowotny | Oct. 11, 1887 |
| 1,348,587 | Rosenfield | Aug. 3, 1920 |
| 1,498,246 | Spencer | July 17, 1924 |
| 1,583,358 | Mayes | May 4, 1926 |
| 1,640,924 | Cook | Aug. 30, 1927 |
| 1,818,917 | Wolf | Aug. 11, 1931 |
| 1,982,345 | Kirby | Nov. 27, 1934 |
| 2,002,633 | Greene | May 28, 1935 |

FOREIGN PATENTS

| 176,249 | Germany | Oct. 18, 1906 |
| 118,201 | Switzerland | Dec. 16, 1926 |